United States Patent [19]
Ream et al.

[11] Patent Number: 6,024,988
[45] Date of Patent: Feb. 15, 2000

[54] CAFFEINE CHEWING GUM

[75] Inventors: Ronald L. Ream, Plano; Christine L. Corriveau, Orland Park; Thomas M. Tongue, Jr., Joliet, all of Ill.

[73] Assignee: Wm. Wrigley Jr. Company, Chicago, Ill.

[21] Appl. No.: 09/088,290

[22] Filed: Jun. 1, 1998

[51] Int. Cl.⁷ ....................................................... A23G 3/30
[52] U.S. Cl. ...................................................... 426/3; 426/5
[58] Field of Search ............................................... 426/3, 5

[56] References Cited

U.S. PATENT DOCUMENTS

| | | | |
|---|---|---|---|
| 4,386,063 | 5/1983 | Boden | 424/49 |
| 4,452,821 | 6/1984 | Gergely | 426/5 |
| 4,533,556 | 8/1985 | Piccolo et al. | 426/3 |
| 4,753,800 | 6/1988 | Mozda | 424/440 |
| 4,753,805 | 6/1988 | Cherukuri et al. | 426/5 |
| 4,971,806 | 11/1990 | Cherukuri et al. | 426/5 |
| 5,126,151 | 6/1992 | Bodor et al. | 426/99 |
| 5,487,902 | 1/1996 | Andersen et al. | 426/3 |

*Primary Examiner*—Arthur L. Corbin
*Attorney, Agent, or Firm*—Hill & Simpson

[57] ABSTRACT

The present invention provides an improved chewing gum composition that includes caffeine. The chewing gum composition includes a specific particle size distribution for the caffeine such that the perceived bitterness of traditional caffeine gums is reduced. Additionally, the present invention provides methods of mixing a caffeine chewing gum composition that likewise reduces bitterness by selecting specific processing times and sequences for the mixing of the various ingredients.

21 Claims, No Drawings

CAFFEINE CHEWING GUM

BACKGROUND OF THE INVENTION

The present invention relates generally to confectionery products, such as chewing gums. More specifically, the present invention relates to confectionery products having specific additives and characteristics.

Providing confectionery products, such as chewing gums and candies, with a variety of flavors is known. For example, chewing gum can include flavoring agents such as: citrus oils; fruit essence; peppermint oil; spearmint oil; clove oil; wintergreen oil; anise; and the like. Additionally, using artificial flavoring agents to provide other flavors to the chewing gum is known.

Providing confectionary products with distinct characteristics is also known. For example, confections that include the chemical caffeine (3,7-Dihydro-1,3,7-trimethyl-1H-purine-2,6-dione) as an ingredient are generally known. However, a disadvantage of such caffeine chewing gums is the bitterness associated with same. As a result of this bitterness, many customers are still resistant to purchase such gums.

Accordingly, a need exists for an improved caffeine gum that reduces the bitterness associated with traditional caffeine chewing gums.

SUMMARY OF THE INVENTION

The present invention provides a caffeine supplemented confectionery product with reduced bitterness as compared to traditional caffeine supplemented products. The product of the present invention reduces bitterness often associated with traditional chewing gums, in part, by incorporating a unique particle size distribution for the caffeine. Additionally, the present invention provides an improved method for preparing a caffeine supplemented chewing gum that reduces perceived bitterness. The fonmula of the caffeine supplemented chewing gum of the present invention has been optimized to add additional sweeteners as well as natural and artificial flavors to mask the bitterness of caffeine. Lastly, the inventors have discovered that utilizing a defined mixing sequence provides a product with reduced bitterness, longer lasting flavor, longer lasting sweetness and consistent caffeine from batch to batch.

The present invention provides a chewing gum composition that includes a unique particle size distribution for the caffeine incorporated into same. Specifically, the present invention provides a chewing gum composition including a water insoluble base portion, a water soluble portion, and caffeine. The caffeine has a particle size distribution of about 0.0% on 40 mesh, about 1–20% on 60 mesh, about 5–30% on 80 mesh and about 50–100% through 80 mesh. The inventors have uniquely found that this particle size distribution reduces bitterness of the resulting chewing gum composition.

In an embodiment, the chewing gum composition includes caffeine in amount of about 0.3% to 3.7% by weight of the chewing gum composition. Preferably, caffeine is present in the chewing gum composition in an amount of about 1.8% by weight.

A variety of different chewing gums can be utilized. For example, in an embodiment, the chewing gum includes sugar. In another embodiment, the chewing gum is substantially wax free. In yet another embodiment, the chewing gum is a low calorie chewing gum.

Still further, in an embodiment, the chewing gum composition includes additional sweeteners as well as natural and artificial flavoring agents to also reduce bitterness. For example, the chewing gum can include sweeteners, such as acesulfame-K, aspartame, saccharin and xylitol. Likewise, the chewing gum composition can include natural and artificial flavors, such as monoammonium glycerrhizinate, glucono delta lactone, ethylmaltol, vanillin, creams, fruit flavors, and spices.

Preferably, in an embodiment, the chewing gum composition includes the following sweeteners and natural and artificial flavoring agents in the identified percentage by weight:

| Component | Percent By Weight |
|---|---|
| Xylitol | 0–5.0% |
| Encapsulated Aspartame | 0–0.5% |
| Encapsulated Acesulfame-K | 0–0.5% |
| Saccharin | 0–0.5% |
| Monoammonium Glycerrhizinate | 0–1.0% |
| Glucono Delta Lactone | 0–2.0% |
| Fruit Flavors | 0–1.0% |
| Ethylmaltol | 0–1.0% |
| Vanillin | 0–1.0% |
| Creams | 0–1.0% |
| Spices | 0–5.0% |

The present invention also provides an improved mixing process for making a chewing gum composition. The inventors have uniquely discovered that utilizing specific process timing for the addition of the ingredients to the gum mixer reduces perceived bitterness of the resulting caffeine supplemented chewing gum. To this end, the mixing method for preparing a chewing gum composition includes the following steps. First, water insoluble gum and gum trim is added to a gum mixer. The addition of the gum base and trim reflects the initial start time and all subsequent timed additions are based on the initial addition of the gum base and trim. A first quantity of a sugar component is then added to the mixer after about 3 to 10 minutes have elapsed since the initial adding of the gum base and trim. Corn syrup is then added after about 5 to 15 minutes have elapsed. The raw material caffeine is then added to the mixer after about 7 to 17 minutes have elapsed since the adding of the initial gum base and trim. Glycerine is added after about 10 to 25 minutes have elapsed. Next, a second quantity of a sugar component is added to the mixer after 15 to 35 minutes have elapsed. Lastly, natural and artificial flavors are added to the mixer after about 20 to 25 minutes have elapsed from the initial additional of the gum base and trim.

In an embodiment, the method of the present invention also includes the step of adding a mixture of xylitol, glucono delta lactone, aspartame, and natural and artificial flavors. This mixture is added to the mixer after about 15 to 30 minutes have elapsed from the initial adding of the gum base and trim.

In another embodiment, the method of the present invention also includes the step of adding colorant to the mixer. When present, the colorant is added to the mixer after about three to five minutes have elapsed since the initial addition of the gum base and trim.

Still further, in an embodiment, the method of the present invention includes the additional step of discontinuing mixing of the ingredients after about twenty to forty minutes have elapsed since the addition of the gum base and trim.

The present invention also provides an improved mixing sequence for preparing a chewing gum composition. The inventors have uniquely discovered that utilizing a specific mixing order for the addition of the ingredients to the gum mixer provides a product with reduced bitterness, longer lasting flavor, longer lasting sweetness, and consistent caffeine content throughout the mix. To this end, the mixing sequence, in an embodiment, is generally as follows: (1) add gum base and trim to a gum mixer; (2) add a first quantity of a first sugar component; (3) add corn syrup; (4) add caffeine; (5) add glycerine; (6) add sweeteners; (7) add a first group of natural and artificial flavors; (8) add a second quantity of a first sugar component; (9) add a second sugar component; and (10) add a second group of natural and artificial flavors.

An advantage of the present invention is to provide an improved confectionery product.

Furthermore, an advantage of the present invention is to provide an improved caffeine chewing gum composition.

Still further, an advantage of the present invention is to provide a chewing gum composition including caffeine that reduces the perceived bitterness associated with traditional caffeine chewing gum.

Moreover, an advantage of the present invention is to provide an improved mixing process for making caffeine supplemented chewing gum that reduces the perceived bitterness associated with traditional caffeine chewing gum.

Another advantage of the present invention is to provide an improved mixing sequence for making caffeine supplemented chewing gum that provides the resulting product with reduced bitterness, longer lasting flavor, longer lasting sweetness, and consistent caffeine content throughout the mix.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved confectionery products. Specifically, the present invention is directed to an improved caffeine chewing gum and improved mixing processes for making same.

The present invention provides confections that contain the raw material caffeine. However, unlike prior compositions, the composition of the present invention uniquely reduces the perceived bitterness often associated with caffeine chewing gums. In this regard, the inventors of the present invention have prepared a caffeine chewing gum with an optimized formula that includes a specific particle size distribution for the raw material caffeine. In addition, the present invention also provides methods for the addition of the various raw ingredients and caffeine that reduce perceived bitterness and produce a product with consistent caffeine content from batch to batch.

Pursuant to the present invention, caffeine is provided in a confectionery product, namely chewing gum, as a raw material (3,7-Dihydro-1,3,7-trimethyl-1H-purine-2,6-dione). In an embodiment, caffeine will comprise at least about 0.3%, by weight, of the chewing gum. Preferably, caffeine comprises approximately 1.6% to about 3.7%, by weight, of the chewing gum composition and delivers about 20 to 100 mg of caffeine per stick of chewing gum. In a preferred embodiment, caffeine is present in an amount of about 1.8% by weight and delivers about 50 mg of caffeine per stick of chewing gum.

The inventors have uniquely discovered a way to reduce bitterness by incorporating a specific distribution of the raw material caffeine. Pursuant to the present invention, the chewing gum incorporates a specific size distribution for the caffeine particles. Preferably, the following particle size distribution is utilized for the caffeine incorporated into the chewing gum:

U.S. Standard 40 mesh about 0.0% retained
U.S. Standard 60 mesh about 1.0–20% retained
U.S. Standard 80 mesh about 5.0–30% retained
U.S. Standard 80 mesh at least about 50% minimum pass through More preferably, the following particle size distribution is utilized for the caffeine:

U.S. Standard 40 mesh about 0.0% retained
U.S. Standard 60 mesh about 20% retained
U.S. Standard 80 mesh about 30% retained
U.S. Standard 80 mesh at least about 50% minimum pass through Referring now to the chewing gum, pursuant to the present invention, the chewing gum including caffeine may be based on a variety of different chewing gums that are known. For example, the chewing gums can be low or high moisture, sugar or sugarless, wax containing or wax free, low calorie (via high base or low calorie bulking agents), and/or may contain dental agents.

Chewing gum generally consists of a water insoluble gum base, a water soluble portion, and flavors. The water soluble portion dissipates with a portion of the flavor of the gum over a period of time during chewing. The gum base portion is retained in the mouth throughout the chew.

The insoluble gum base generally comprises elastomers, resins, fats and oils, softeners and inorganic fillers. The gum base may or may not include wax. The insoluble gum base can constitute about 8.0% to about 50%, by weight, of the chewing gum. Preferably, the insoluble gum base comprises about 11% to about 28%, by weight, of the chewing gum.

In an embodiment, the chewing gum base of the present invention contains about 20% to about 60% by weight synthetic elastomer, about 0% to about 30% by weight natural elastomer, about 5% to about 55% by weight elastomer plasticizer, about 4% to about 35% by weight filler, about 5% to about 35% by weight softener, and optional minor amounts (about 1% or less by weight) of miscellaneous ingredients such as colorants, antioxidants, etc.

Synthetic elastomers may include, but are not limited to, polyisobutylene with GPC weight average molecular weight of about 10,000 to about 95,000, isobutylene-isoprene copolymer (butyl elastomer), styrene-butadiene, copolymers having styrene-butadiene ratios of about 1:3 to about 3:1, polyvinyl acetate having GPC weight average molecular weight of about 2,000 to about 90,000, polyisoprene, polyethylene, vinyl acetateg-vinyl laurate copolymer having vinyl laurate content of about 5% to about 50% by weight of the copolymer, and combinations thereof.

Preferred ranges for polyisobutylene are 50,000 to 80,000 GPC weight average molecular weight and for styrene-butadiene are 1:1 to 1:3 bound styrene-butadiene, for polyvinyl acetate are 10,000 to 65,000 GBC weight average molecular weight with the higher molecular weight polyvinyl acetates typically used in bubble gum base, and for vinyl acetate-vinyl laurate, vinyl laurate content of 10–45%.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters or partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof. In an embodiment, the composition includes Blue #1 Lake and Yellow #5 Lake as the colorants.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5% to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute about 5% to about 95% by weight of the chewing gum, more typically, about 20% to about 80% by weight, and more commonly, about 30% to about 60% by weight of the gum. Sugar sweeteners generally include saccharide-containing components commonly known in the chewing gum art, including but not limited to, sucrose, dextrose, maltose, dextrin, dried invert sugar, fructose, levulose, glactose, corn syrup solids, and the like, alone or in combination. Sugarless sweeteners include, but are not limited to, sugar alcohols such as sorbitol, mannitol, xylitol, hydrogenated starch hydrolysates, maltitol, and the like, alone or in combination.

High intensity artificial sweeteners can also be used, alone or in combination, with the above. Preferred sweeteners include, but are not limited to, sucralose, aspartame, salts of acesulfame, altitame, saccharin and its salts, cyclamic acid and its salts, glycerrhizinate, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can also be used, if desired. The flavor can be used in amounts of about 0.1 to about 15 weight percent of the gum, and preferably, about 0.2% to about 5% by weight. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

In addition to the unique size distribution of the caffeine, the formula of the chewing gum composition has been optimized to add additional sweeteners as well as natural and artificial flavors and chemicals to mask the bitterness of the caffeine. Specifically, pursuant to the present invention, the chewing gum composition preferably includes additional quantities of the following sweeteners in the identified approximate weight percent: 0 to 0.5% active encapsulated aspartame, 0 to 0.5% active encapsulated acesulfame-K and 0 to 0.5% xylitol. Likewise, the following natural and artificial flavors and chemicals are used in the identified approximate weight percent: 0 to 1.0% monoammonium glycerrhizinate, 0 to 2.0% glucono delta lactone, 0 to 1.0% artificial hot capsicum, 0 to 1.0% tangerine oil, 0 to 5.0% cinnamon oil, 0 to 5.0% peppermint flavor and/or oil, and 0 to 5.0% natural and artificial flavor enhancers. In a preferred embodiment, the chewing gum composition includes the following sweeteners in the identified weight percent: 0.29% active encapsulated aspartame, 0.05% active encapsulated acesulfame-K and 2.9% xylitol and the following natural and artificial flavors and chemicals: 0.021% monoammonium glycerrhizinate, 0.5% glucono delta lactone, 0.1% artificial hot capsicum, 0.1% tangerine oil, 0.1% cinnamon, 0.1% peppermint flavor and/or oil, and 0.75% natural and artificial flavor enhancers.

By way of example, and not limitation, the chewing gums can have the following construction (all percentages by weight): about 50% to about 82% sugar; about 11% to about 28% gum base; about 5% to about 15% corn syrup; about 1% to about 7% natural and artificial flavors; about 1% to about 6% glycerine; about 0% to about 10% xylitol and about 1.6% to about 3.7% caffeine. In addition, in preferred embodiments, the composition further includes about 0% to about 1.5% glucono delta lactone; about 0% to about 0.5% aspartame; about 0% to about 0.6% acesulfame-K; about 0% to about 1.0% monoammonium glycerrhizinate (natural flavor); about 0% to about 0.05 Blue #1 Lake; and about 0% to about 0.05% Yellow #5 Lake (all percentages by weight).

By way of example, and not limitation, an example of a chewing gum composition of the present invention is as follows:

FORMULA

| Ingredient | Percentage by Weight |
|---|---|
| Sugar | 59.188 |
| Gum Base | 19.5 |
| Corn Syrup | 8.0 |
| Natural and Artificial Flavors | 4.5 |
| Glycerine | 3.0 |
| Xylitol | 2.9 |
| Caffeine | 1.813 |
| Glucono Delta Lactone | 0.5 |
| Encapsulated Aspartame | 0.37 |
| Encapsulated Acesulfame-K | 0.20 |
| Monoammonium Glycerrhizinate (Natural Flavor) | 0.021 |
| Blue #1 Lake | 0.004 |
| Yellow #5 Lake | 0.004 |

Uniquely, the inventors of the present invention have discovered that utilizing a specific mixing order for the ingredients of the chewing gum composition provides the resulting product with reduced bitterness, longer lasting flavor, longer lasting sweetness, and consistent caffeine throughout the mix. Specifically, the inventors have discovered that certain ingredients are preferably added before others during the manufacturing of the chewing gum composition. By way of example, and not limitation, examples of suitable mixing orders of the various ingredients that may be utilized pursuant to the present invention are as follows:

MIXING ORDER

| Ingredients | Examples | | |
|---|---|---|---|
| Gum Trim | 1 | 1 | 1 |
| Gum Base | 2 | 2 | 2 |
| Color | 3 | 3 | 3 |
| Sugar (Powder) (½ quantity) | 4 | 4 | 4 |
| Corn Syrup | 5 | 5 | 5 |
| Caffeine | 6 | 17 | 14 |
| Glycerine | 7 | 6 | 6 |
| Xylitol | 8 | 7 | 7 |
| Encapsulated Acesulfame-K and aspartame | 9 | 8 | 8 |
| Monoammonium Glycerrhizinate | 11 | 10 | 10 |
| Natural and Artificial Flavor Enhancers | 12 | 11 | 11 |
| Sugar (Powder) (Final Quantity) | 13 | 12 | 12 |
| Bakers Special Sugar | 14 | 13 | 13 |
| Peppermint Flv. (Liq) | 16 | 14 | 16 |
| Artificial Hot Capsicum (Liq) | 17 | 15 | 17 |
| Peppermint (dry) | 15 | 16 | 15 |

More preferably, the inventors have discovered that the following mixing order provides the most beneficial results:

| Ingredients | Order |
|---|---|
| Gum Trim | 1 |
| Gum Base | 2 |
| Color | 3 |
| Sugar (Powder) (½ quantity) | 4 |

-continued

| Ingredients | Order |
|---|---|
| Corn Syrup | 5 |
| Caffeine | 6 |
| Glycerine | 7 |
| Xylitol | 8 |
| Encapsulated Acesulfame-K and aspartame | 9 |
| Monoammonium Glycerrhizinate | 11 |
| Natural and Artificial Flavor Enhancers | 12 |
| Sugar (Powder) (Final Quantity) | 13 |
| Bakers Special Sugar | 14 |
| Peppermint Flv. (Liq) | 15 |
| Artificial Hot Capsicum (Liq) | 16 |
| Peppermint (dry) | 17 |

In addition to discovering improved mixing sequences, the inventors have discovered that specific sheeting gum specifications allows for the achievement of consistent caffeine content from stick to stick. Preferably, the following sheeting specifications are utilized pursuant to the present invention:

| | |
|---|---|
| Single Sheet | 78 sticks |
| Sheet Weight | 210.6–234.0 grams |
| Sheet Thickness | 0.063"–0.066" |
| Sheet Length | 17"–17-3/16" |
| Sheet Width | 9-3/4"–9-7/8" |
| Stick Length | 2-13/16"–2-7/8" |
| Stick Width | 0.750"–0.760" |

The present invention also provides an improved mixing method incorporating processing times for preparing caffeine chewing gum. With the method of the present invention, the perceived bitterness often associated with caffeine chewing gum is reduced. Specifically, the inventors of the present invention have discovered that utilizing a specific process timing for the addition of raw ingredients and caffeine to a gum mixer reduces bitterness.

Pursuant to the present invention, suitable manufacturing processing times for the mixing of the ingredients of the present caffeine chewing gum are generally as follows:

| Ingredients | Ingredients addition to the gum mixer (Time = minutes) |
|---|---|
| Gum Base and Gum Trim | Start Time = 0.0 |
| Blue #1 Lake | 3–5 |
| Yellow #5 Lake | 3–5 |
| Sugar (½ Quantity) | 3–10 |
| Corn Syrup | 5–15 |
| Caffeine | 7–17 |
| Glycerine | 10–25 |
| Xylitol | 15–30 |
| Glucono Delta Lactone | |
| Encapsulated Acesulfame-K | |
| Encapsulated Aspartame | |
| Monoammonium Glycerrhizinate (Natural Flavor) | |
| (Dry) Natural and Artificial Flavors (0.12%) | |
| Sugar (Final 1/2 Quantity) | 15–35 |
| (Liquid) Natural and Artificial Flavors (0.22%) | 20–35 |
| (Dry) Natural and Artificial Flavors (0.66%) | 20–35 |
| STOP Mixing | 20–40 |

Of course, the above general times should not be interpreted to mean all such ingredients are necessarily included in the chewing gum composition. Instead, if and when such ingredients are utilized, the chart above details the general time additions for each such ingredient.

Preferably, the inventors have discovered that the following manufacturing process times for the mixing of ingredients of the present caffeine chewing gum provide the most beneficial results:

| RAW MATERIALS | Batch 1 | Batch 2 |
|---|---|---|
| *Preferred Process Times "Time" (Minutes:Seconds)* | | |
| STEP 1 | 0.0 | 0.0 |
| Gum Trim | | |
| Gum Base | | |
| Yellow #5 Lake | | |
| Blue #1 Lake | | |
| STEP 2 | 5.0 | 5.0 |
| Sugar, Powder (direct) | | |
| Corn Syrup 4300 (direct) | | |
| Caffeine, FCIII, 98.5% | | |
| STEP 3 | 22.0 | 15.0 |
| Glycerine, 96% USP (direct) | | |
| STEP 4 | 25.0 | 19.0 |
| Xylitol | | |
| Encapsulated Acesulfame-K | | |
| Encapsulated Aspartame | | |
| Monoammonium Glycerrhizinate | | |
| Glucono Delta Lactone (GDL) | | |
| Natural & Artificial Flavor Enhancers | | |
| Sugar, Powder (direct) | | |
| Bakers Special Sugar | | |
| STEP 5 | 27.0 | 22.0 |
| Peppermint Flavor (Liq.) | | |
| Artificial Hot Capsicum (Liq.) | | |
| STEP 6 | 29.0 | 23.0 |
| Nor-Cap Peppermint | | |
| TOTAL TIME (STOP MIXING) | 32.0 | 26.0 |

EXPERIMENTAL EXAMPLES

The methods and sheeted gum specifications of the present invention uniquely provide a resulting caffeine product with reduced bitterness, longer lasting flavor, longer lasting sweetness, and consistent caffeine content from stick to stick. By way of example, and not limitation, examples of experimental chewing gum compositions of the present invention, manufacturing times for mixing of the ingredients in same, and the caffeine content obtained in each such composition will now be given.

Procedure

In each of these experiments, the following procedure was utilized. First, the following equipment was used in these experiments: gum mixing equipment—Ann Tsung Mixer 150 gallon gum mixer (#7); gum sheeting equipment—#4 Gimpel Sheeting Machine with Togum Extruder; and gum wrapping and packaging—KLEL 5-stick wrapper. Second, the following process was utilized to prepare and analyze each batch of the respective chewing gum compositions:

A. Mixing and Sheeting Steps

Raw materials were preweighed and direct charged at certain intervals into the mixer. Specifically, the groups of ingredients within a step were added to the mixer in the identified sequence using time as a guideline. Mixing times were recorded on a Batch Record. Following the completion of the mixing step, the product was discharged into loaves and placed on clean, dusted, stainless steel hand trucks, where it was transferred to the Gimpel Sheeting Machine, where the product is sheeted into target sheets of 17" to 17¼" in length, 9¹²⁄₁₆" to 9¹⁴⁄₁₆" in width, and 0.060" to 0.064" thick. The sheets were then placed on sheeting boards. The sheets were stored in a cooling tunnel for approximately 48 hours. Any remaining trim, rework, and scrap was quarantined until testing was completed by an outside laboratory.

B. Collectine and Analysis of Sheeting Samples

Every 15 minutes, a stack of approximately 20 sheets were removed, labeled and put aside. Each sheet had 78 sticks (13 sticks over the length and 6 sticks over the width). Each labeled row was sampled over the width, based on the sheet (i.e. sample Row 1, Sheet 1; Row 2, Sheet 2). The samples were then appropriately labeled and set aside. For analysis, the outside laboratory removed one (1) stick per pack of sample. Each sample was measured for mg of caffeine content by an independent laboratory.

C. Packaging Step

The sheeted material was removed from the cooling tunnel and delivered to the KLEL "5-Stick Packing Line." The product was fed into the magazine feeding the gum breakers in cards of 13 sticks. The gum cards were broken into sticks and wrapped with an inner stick wrap and then a stick outer wrap (paper, printed). The gum sticks were collected in groups of five and wrapped with a counterband (poly laminated paper—microfoil—on line).

The batches were packaged to produce finished lots. Packaged product were then weighed and labeled for shipment, pending analysis.

D. Collecting and Analysis of Packaging Samples 5-stick packs of chewing gum were randomly collected from the KLEL packaging line approximately every hour for a total of 80 samples per the lot code date composite. One stick was removed from 10 of the 80 5-stick packs and each sample was measured for mg of caffeine by an independent laboratory.

EXPERIMENTAL EXAMPLE #1

| RAW MATERIALS | Batch #12 | Batch #13 |
|---|---|---|
| *Mixing Process - "Time" (Minutes:Seconds)* | | |
| STEP 1 | 0.0 | 0.0 |
| Gum Trim | | |
| Gum Base | | |
| Yellow #5 Lake | | |
| Blue #1 Lake | | |
| STEP 2 | 5.00 | 6.00 |
| Sugar, Powdered (direct) | | |
| Corn Syrup 4300 (direct) | | |
| Bakers Special Sugar | | |
| Caffeine, FCIII, 98.5% | | |
| STEP 3 | 9.30 | 10.00 |
| Glycerine, 96% USP (direct) | | |
| STEP 4 | 12.00 | 13.00 |
| Xylitol | | |
| N&A Tangerine (SD) | | |
| Encapsulated Acesulfame-K | | |
| Encapsulated Aspartame | | |
| Monoammonium Glycerrhizinate | | |
| Glucono Delta Lactone (GDL) | | |
| Sugar Powdered (direct) | | |
| STEP 5 | 16.00 | 17.00 |
| Doublemint (Liq. Fiv.) | | |
| Tangerine Oil (Liq.) | | |
| Artificial Hot Capsicum (Liq.) | | |
| STEP 6 | 19.00 | 19.00 |
| Nor-Cap Peppermint | | |
| Nat. Peppermint (Dry) | | |
| TOTAL TIME (STOP MIXING) | 24.00 | 21.00 |

-continued

CAFFEINE CONTENT ANALYSIS FOR SHEETED MATERIAL BATCH #12

| | Sample Weight "Stick Weight in Grams" | Caffeine "mg" |
|---|---|---|
| 1. Sheet 1, Row 1 | 2.8844 | 54.0359 |
| 2. Sheet 2, Row 2 | 2.8676 | 50.6315 |
| 3. Sheet 3, Row 3 | 2.8840 | 54.8825 |
| 4. Sheet 4, Row 4 | 2.8580 | 50.6453 |
| 5. Sheet 5, Row 5 | 2.8058 | 48.2112 |
| 6. Sheet 6, Row 6 | 2.8793 | 48.1708 |
| 7. Sheet 7, Row 1 | 2.8911 | 52.8594 |
| 8. Sheet 8, Row 2 | 2.9133 | 50.4831 |
| 9. Sheet 9, Row 3 | 2.8578 | 47.5714 |
| 10. Sheet 10, Row 4 | 2.8828 | 51.4311 |
| Average = | 2.87241 | 50.89222 |
| STDEV = | 0.02855 | 2.49184 |
| Relative STD % = | 0.99394 | 4.896309 |

CAFFEINE CONTENT ANALYSIS FOR SHEETED MATERIAL BATCH #13

| | Sample Weight "Stick Weight in Grams" | Caffeine "mg" |
|---|---|---|
| 1. Sheet 1, Row 1 | 2.8833 | 48.9580 |
| 2. Sheet 2, Row 2 | 2.8984 | 45.2571 |
| 3. Sheet 3, Row 3 | 2.9000 | 45.1926 |
| 4. Sheet 4, Row 4 | 2.8557 | 46.8328 |
| 5. Sheet 5, Row 5 | 2.8860 | 43.3339 |
| 6. Sheet 6, Row 6 | 2.8547 | 46.2309 |
| 7. Sheet 7, Row 1 | 2.8631 | 46.5067 |
| 8. Sheet 8, Row 2 | 2.8792 | 44.9487 |
| 9. Sheet 9, Row 3 | 2.8646 | 44.2118 |
| 10. Sheet 10, Row 4 | 2.8996 | 51.4875 |
| Average = | 2.87846 | 46.296 |
| STDEV = | 0.01795 | 2.394546 |
| Relative STD % = | 0.623604 | 5.172252 |

CAFFEINE CONTENT ANALYSIS FOR PACKAGED MATERIAL Composite Consisting of Batches 12 & 13

| | Sample Weight "Stick Weight in Grams" | Caffeine "mg" |
|---|---|---|
| 1. Pack 1 | 2.9098 | 47.4154 |
| 2. Pack 2 | 2.8408 | 45.0674 |
| 3. Pack 3 | 2.8595 | 43.3832 |
| 4. Pack 4 | 2.8825 | 45.6274 |
| 5. Pack 5 | 2.8113 | 52.7963 |
| 6. Pack 6 | 2.9051 | 47.8354 |
| 7. Pack 7 | 2.8574 | 45.1076 |
| 8. Pack 8 | 2.7970 | 45.9631 |
| 9. Pack 9 | 2.8557 | 47.4832 |
| 10. Pack 10 | 2.6810 | 44.8534 |
| Average = | 2.84001 | 46.55324 |
| STDEV = | 0.0665 | 2.596355 |
| Relative STD% = | 2.341537 | 5.577173 |

EXPERIMENTAL EXAMPLE #2

Mixing Process - "Time" (Minutes:Seconds)

| RAW MATERIALS | Batch #14 | Batch #15 | Batch #16 | Batch #17 | Batch #18 |
|---|---|---|---|---|---|
| STEP 1 | 0.0 | 0.0 | 0.0 | 0.0 | 0.0 |
| Gum Trim | | | | | |
| Gum Base | | | | | |
| Yellow #5 Lake | | | | | |
| Blue #1 Lake | | | | | |
| STEP 2 | 8.0 | 8.00 | 5.30 | 5.30 | 6.00 |
| Sugar, Powdered (direct) | | | | | |
| Corn Syrup 4300 (direct) | | | | | |
| Bakers Special Sugar | | | | | |
| Caffeine, FCIII, 98.5% | | | | | |
| STEP 3 | 14.0 | 14.00 | 10.00 | 6.30 | 10.00 |
| Glycerine, 96% USP (direct) | | | | | |
| STEP 4 | 16.0 | 16.0 | 14.30 | 8.30 | 13.00 |
| Xylitol | | | | | |
| N&A Tangerine (SD) | | | | | |
| Encapsulated Acesulfame-K | | | | | |
| Encapsulated Aspartame | | | | | |
| Monoammonium Glycerrhizinate | | | | | |
| Glucono Delta Lactone (GDL) | | | | | |
| Bakers Special Sugar | | | | | |
| Sugar Powdered (direct) | | | | | |
| STEP 5 | 20.00 | 20.00 | 17.30 | 14.00 | 19.00 |
| Doublemint (Liq. Fiv.) | | | | | |
| Tangerine Oil (Liq.) | | | | | |
| Art. Hot Capsicum (Liq.) | | | | | |
| STEP 6 | 22.30 | 22.00 | 19.00 | 15.00 | 21.00 |
| Nor-Cap Peppermint | | | | | |
| Nat. Peppermint (Dry) | | | | | |
| TOTAL TIME (STOP MIXING) | 27.00 | 25.30 | 23.30 | 19.00 | 26.00 |

CAFFEINE CONTENT ANALYSIS FOR SHEETED MATERIAL BATCH NUMBERS 14, 15, 16, 17, & 18

| Sample Number | "mg" caffeine | Stick Weight "grams" |
|---|---|---|
| 1. Batch 14, Row 1, Sheet 1 | 46.472 | 2.7983 |
| 2. Batch 14, Row 2, Sheet 2 | 46.1466 | 2.8107 |
| 3. Batch 14, Row 3, Sheet 3 | 49.1269 | 2.8455 |
| 4. Batch 14, Row 4, Sheet 4 | 44.7627 | 2.718 |
| 5. Batch 14, Row 5, Sheet 5 | 45.2759 | 2.8355 |
| 6. Batch 14, Row 6, Sheet 6 | 45.2759 | 2.8355 |
| 7. Batch 14, Row 1, Sheet 7 | 46.6309 | 2.8385 |
| 8. Batch 14, Row 2, Sheet 8 | 45.2235 | 2.7962 |
| 9. Batch 14, Row 3, Sheet 9 | 44.2763 | 2.7889 |
| 10. Batch 14, Row 4, Sheet 10 | 45.5189 | 2.8639 |
| 11. Batch 15, Row 1, Sheet 1 | 46.1941 | 2.8302 |
| 12. Batch 15, Row 2, Sheet 2 | 47.571 | 2.8799 |
| 13. Batch 15, Row 3, Sheet 3 | 44.7222 | 2.8017 |
| 14. Batch 15, Row 4, Sheet 4 | 46.7538 | 2.8848 |
| 15. Batch 15, Row 5, Sheet 5 | 45.6089 | 2.8625 |
| 16. Batch 15, Row 6, Sheet 6 | 45.4706 | 2.8319 |
| 17. Batch 15, Row 1, Sheet 7 | 43.9263 | 2.845 |
| 18. Batch 15, Row 2, Sheet 8 | 44.2793 | 2.7553 |
| 19. Batch 15, Row 3, Sheet 9 | 46.2868 | 2.8235 |
| 20. Batch 15, Row 4, Sheet 10 | 45.0653 | 2.7961 |
| 21. Batch 16, Row 1, Sheet 1 | 45.1433 | 2.8352 |
| 22. Batch 16, Row 2, Sheet 2 | 45.6164 | 2.8532 |
| 23. Batch 16, Row 3, Sheet 3 | 44.121 | 2.705 |
| 24. Batch 16, Row 4, Sheet 4 | 43.4563 | 2.7902 |
| 25. Batch 16, Row 5, Sheet 5 | 46.1224 | 2.8154 |
| 26. Batch 16, Row 6, Sheet 6 | 45.3947 | 2.8294 |
| 27. Batch 16, Row 1, Sheet 7 | 45.0687 | 2.7913 |
| 28. Batch 16, Row 2, Sheet 8 | 42.594 | 2.7489 |
| 29. Batch 16, Row 3, Sheet 9 | 43.5791 | 2.7714 |
| 30. Batch 16, Row 4, Sheet 10 | 46.5177 | 2.8393 |
| 31. Batch 17, Row 1, Sheet 1 | 54.5077 | 2.9304 |
| 32. Batch 17, Row 2, Sheet 2 | 46.7969 | 2.8734 |
| 33. Batch 17, Row 3, Sheet 3 | 50.1071 | 2.9535 |
| 34. Batch 17, Row 4, Sheet 4 | 46.2067 | 2.8306 |
| 35. Batch 17, Row 5, Sheet 5 | 48.3656 | 2.9176 |
| 36. Batch 17, Row 6, Sheet 6 | 49.5455 | 2.9393 |
| 37. Batch 17, Row 1, Sheet 7 | 48.3548 | 2.8973 |
| 38. Batch 17, Row 2, Sheet 8 | 49.6659 | 2.9598 |
| 39. Batch 17, Row 3, Sheet 9 | 49.7461 | 2.9001 |
| 40. Batch 17, Row 4, Sheet 10 | 49.9325 | 2.9024 |
| 41. Batch 18, Row 1, Sheet 1 | 45.1355 | 2.7884 |
| 42. Batch 18, Row 2, Sheet 2 | 43.4784 | 2.698 |
| 43. Batch 18, Row 3, Sheet 3 | 45.534 | 2.8477 |
| 44. Batch 18, Row 4, Sheet 4 | 44.8727 | 2.794 |
| 45. Batch 18, Row 5, Sheet 5 | 43.5878 | 2.8523 |
| 46. Batch 18, Row 6, Sheet 6 | 47.4743 | 2.8422 |

|  |  |  |  |
|---|---|---|---|
| 47. Batch 18, Row 1, Sheet 7 | | 45.8668 | 2.8779 |
| 48. Batch 18, Row 2, Sheet 8 | | 45.8144 | 2.8944 |
| 49. Batch 18, Row 3, Sheet 9 | | 45.5369 | 2.8802 |
| 50. Batch 18, Row 4, Sheet 10 | | 46.7289 | 2.8386 |

|  |  | Specifications |  | Target |
|---|---|---|---|---|
| Mean | 46.19755 | 42.5–57.5 | 2.836812 | 2.7–3.0 grams |
| Sample Standard Deviation | 2.174059 | | 0.058679 | |
| Relative Standard Deviation | 4.706006 | <6.0% | 2.068496 | |

CAFFEINE CONTENT ANALYSIS FOR PACKAGED MATERIAL
Composite Consisting of Batches 14, 15, 16, 17 & 18

|  | Sample Weight "Stick Weight in Grams" | Caffeine "mg" |
|---|---|---|
| 1. Pack 1 | 2.8173 | 46.5280 |
| 2. Pack 2 | 2.8098 | 46.9024 |
| 3. Pack 3 | 2.7610 | 46.1429 |
| 4. Pack 4 | 2.8336 | 46.2541 |
| 5. Pack 5 | 2.7724 | 44.6898 |
| 6. Pack 6 | 2.7366 | 43.9324 |
| 7. Pack 7 | 2.8354 | 46.3641 |
| 8. Pack 8 | 2.8470 | 47.2503 |
| 9. Pack 9 | 2.7985 | 46.0619 |
| 10. Pack 10 | 2.7447 | 44.6308 |
| Average = | 2.79563 | 45.87567 |
| STDEV = | 0.039663 | 1.084716 |
| Relative STD % = | 1.418738 | 2.364468 |

CAFFEINE CONTENT ANALYSIS FOR PACKAGED MATERIAL
Composite Consisting of Batches 14, 15, 16, 17 & 18

|  | Sample Weight "Stick Weight in Grams" | Caffeine "mg" |
|---|---|---|
| 1. Pack 1 | 2.8497 | 45.8840 |
| 2. Pack 2 | 2.8466 | 44.6402 |
| 3. Pack 3 | 2.8368 | 44.3693 |
| 4. Pack 4 | 2.8524 | 42.5548 |
| 5. Pack 5 | 2.9279 | 47.9683 |
| 6. Pack 6 | 2.8263 | 45.3802 |
| 7. Pack 7 | 2.7962 | 43.8436 |
| 8. Pack 8 | 2.8049 | 44.5692 |
| 9. Pack 9 | 2.9085 | 48.2037 |
| 10. Pack 10 | 2.9625 | 49.0170 |
| Average = | 2.86118 | 45.64303 |
| STDEV = | 0.054343 | 2.109002 |
| Relative STD % = | 1.899333 | 4.620645 |

CAFFEINE CONTENT ANALYSIS FOR PACKAGED MATERIAL
Composite Consisting of Batches 14, 15, 16, 17 & 18

|  | Sample Weight "Stick Weight in Grams" | Caffeine "mg" |
|---|---|---|
| 1. Pack 1 | 2.8007 | 46.5645 |
| 2. Pack 2 | 2.8688 | 46.6899 |
| 3. Pack 3 | 2.8701 | 47.7894 |
| 4. Pack 4 | 2.8181 | 46.5815 |
| 5. Pack 5 | 2.8521 | 47.1110 |
| 6. Pack 6 | 2.8589 | 44.5283 |
| 7. Pack 7 | 2.7463 | 44.7219 |
| 8. Pack 8 | 2.7569 | 43.8437 |
| 9. Pack 9 | 2.8633 | 45.4831 |
| 10. Pack 10 | 2.8185 | 45.2114 |
| Average = | 2.82537 | 45.85247 |
| STDEV = | 0.045720 | 1.277564 |
| Relative STD % = | 1.618211 | 2.786249 |

CAFFEINE CONTENT ANALYSIS FOR PACKAGED MATERIAL
Composite Consisting of Batches 14, 15, 16, 17 & 18

|  | Sample Weight "Stick Weight in Grams" | Caffeine "mg" |
|---|---|---|
| 1. Pack 1 | 2.8437 | 46.6770 |
| 2. Pack 2 | 2.8831 | 48.1670 |
| 3. Pack 3 | 2.8538 | 47.6065 |
| 4. Pack 4 | 2.7571 | 45.0572 |
| 5. Pack 5 | 2.9482 | 49.1919 |
| 6. Pack 6 | 2.8507 | 47.4453 |
| 7. Pack 7 | 2.7996 | 46.1605 |
| 8. Pack 8 | 2.8207 | 46.2409 |
| 9. Pack 9 | 2.8532 | 46.9592 |
| 10. Pack 10 | 2.7849 | 46.9383 |
| Average = | 2.83950 | 47.04438 |
| STDEV = | 0.053716 | 1.148817 |
| Relative STD % = | 1.891727 | 2.441985 |

EXPERIMENTAL EXAMPLE #3

Mixing Process - "Time" (Minutes:Seconds)

| RAW MATERIALS | Batch #19 | Batch #20 | Batch #21 | Batch #22 | Batch #23 |
|---|---|---|---|---|---|
| STEP 1 | 0.0 | 0.0 | 0.0 | 0.0 | 0.0 |
| Gum Trim | | | | | |
| Gum Base | | | | | |
| Yellow #5 Lake | | | | | |
| Blue #1 Lake | | | | | |
| STEP 2 | 7.0 | 5.30 | 4.30 | 5.00 | 5.00 |
| Sugar, Powdered (direct) | | | | | |
| Corn Syrup 4300 (direct) | | | | | |
| Caffeine, FCIII, 98.5% | | | | | |
| STEP 3 | 13.0 | 10.45 | 9.00 | 9.30 | 11.00 |
| Glycerine, 96% USP (direct) | | | | | |
| STEP 4 | 17.0 | 12.45 | 11.00 | 11.00 | 14.00 |
| Xylitol | | | | | |
| N&A Tangerine (SD) | | | | | |
| Encapsulated Acesulfame-K | | | | | |
| Encapsulated Aspartame | | | | | |
| Monoammonium Glycerrhizinate | | | | | |
| Glucono Delta Lactone (GDL) | | | | | |
| Sugar Powdered (direct) | | | | | |
| Bakers Special Sugar | | | | | |
| STEP 5 | 22.40 | 17.30 | 17.30 | 16.30 | 20.00 |
| Doublemint (Liq. Fiv.) | | | | | |
| Tangerine Oil (Liq.) | | | | | |
| Art. Hot Capsicum (Liq.) | | | | | |
| STEP 6 | 23.45 | 19.00 | 19.00 | 17.30 | 21.00 |
| Nor-Cap Peppermint | | | | | |
| Nat. Peppermint (Dry) | | | | | |
| TOTAL TIME (STOP MIXING) | 26.47 | 22.00 | 22.30 | 29.00 | 24.00 |

CAFFEINE CONTENT ANALYSIS FOR SHEETED MATERIAL BATCH NUMBERS 19, 20, 21, 22, & 23

| Sample Number | "mg" caffeine | Stick Weight "grams" |
|---|---|---|
| 1. Batch 19, Row 1, Sheet 1 | 45.924 | 2.7559 |
| 2. Batch 19, Row 2, Sheet 2 | 48.1312 | 2.7559 |
| 3. Batch 19, Row 3, Sheet 3 | 45.4377 | 2.7859 |
| 4. Batch 19, Row 4, Sheet 4 | 54.4165 | 2.764 |
| 5. Batch 19, Row 5, Sheet 5 | 45.5848 | 2.6893 |
| 6. Batch 19, Row 6, Sheet 6 | 45.3808 | 2.7904 |
| 7. Batch 20, Row 1, Sheet 1 | 43.0264 | 2.8237 |

-continued

| | | | |
|---|---|---|---|
| 8. Batch 20, Row 2, Sheet 2 | 44.5509 | 2.7413 | |
| 9. Batch 20, Row 3, Sheet 3 | 47.8951 | 2.8284 | |
| 10. Batch 20, Row 4, Sheet 4 | 47.6337 | 2.8149 | |
| 11. Batch 20, Row 5, Sheet 5 | 45.1833 | 2.8605 | |
| 12. Batch 20, Row 6, Sheet 6 | 47.0643 | 2.8805 | |
| 13. Batch 21, Row 1, Sheet 1 | 45.4411 | 2.8785 | |
| 14. Batch 21, Row 2, Sheet 2 | 47.6522 | 2.7922 | |
| 15. Batch 21, Row 3, Sheet 3 | 47.363 | 2.8705 | |
| 16. Batch 21, Row 4, Sheet 4 | 44.5215 | 2.7924 | |
| 17. Batch 21, Row 5, Sheet 5 | 49.0658 | 2.8911 | |
| 18. Batch 21, Row 6, Sheet 6 | 44.2783 | 2.8497 | |
| 19. Batch 22, Row 1, Sheet 1 | 47.6535 | 2.8487 | |
| 20. Batch 22, Row 2, Sheet 2 | 45.291 | 2.8575 | |
| 21. Batch 22, Row 3, Sheet 3 | 45.0688 | 2.8609 | |
| 22. Batch 22, Row 4, Sheet 4 | 44.3089 | 2.7378 | |
| 23. Batch 22, Row 5, Sheet 5 | 44.3919 | 2.8398 | |
| 24. Batch 22, Row 6, Sheet 6 | 45.9435 | 2.8062 | |
| 25. Batch 23, Row 1, Sheet 1 | 46.8234 | 2.8184 | |
| 26. Batch 23, Row 2, Sheet 2 | 44.6789 | 2.8334 | |
| 27. Batch 23, Row 3, Sheet 3 | 47.1159 | 2.8613 | |
| 28. Batch 23, Row 4, Sheet 4 | 45.7829 | 2.8806 | |
| 29. Batch 23, Row 5, Sheet 5 | 45.7216 | 2.8746 | |
| 30. Batch 23, Row 6, Sheet 6 | 47.8803 | 2.8639 | |
| | | Specifications | | Target |
| Mean | 46.30704 | 42.5–57.5 | 2.821607 | 2.7–3.0 grams |
| Sample Standard Deviation | 2.107148 | | 0.051581 | |

-continued

| | | | |
|---|---|---|---|
| Relative Standard Deviation | 4.550384 | <6.0% | 1.828069 |

CAFFEINE CONTENT ANALYSIS
FOR PACKAGED MATERIAL
Composite Consisting of
Batches 19, 20, 21, 22, & 23

| | Sample Weight "Stick Weight in Grams" | Caffeine "mg" |
|---|---|---|
| 1. Pack 1 | 2.7883 | 46.3177 |
| 2. Pack 2 | 2.7603 | 46.4679 |
| 3. Pack 3 | 2.7612 | 45.9609 |
| 4. Pack 4 | 2.8871 | 46.9244 |
| 5. Pack 5 | 2.8860 | 47.8109 |
| 6. Pack 6 | 2.8338 | 47.2787 |
| 7. Pack 7 | 2.8669 | 46.8401 |
| 8. Pack 8 | 2.8319 | 47.2734 |
| 9. Pack 9 | 2.8146 | 45.6136 |
| 10. Pack 10 | 2.9157 | 47.5877 |
| Average = | 2.83458 | 46.80753 |
| STDEV = | 0.054241 | 0.712328 |
| Relative STD % = | 1.913532 | 1.521824 |

EXPERIMENTAL EXAMPLE #4

| | Mixing Process - "Time" (Minutes:Seconds) | | | | | |
|---|---|---|---|---|---|---|
| RAW MATERIALS | Batch #24 | Batch #25 | Batch #26 | Batch #27 | Batch #28 | Batch #29 |
| Step 1 | 0.0 | 0.0 | 0.0 | 0.0 | 0.0 | 0.0 |
| Gum Trim | | | | | | |
| Gum Base | | | | | | |
| Yellow #5 Lake | | | | | | |
| Blue #1 Lake | | | | | | |
| STEP 2 | 5.0 | 5.00 | 5.00 | 5.00 | 5.00 | 5.00 |
| Sugar, Powdered (direct) | | | | | | |
| Corn Syrup 4300 (direct) | | | | | | |
| Caffeine, FCIII, 98.5% | | | | | | |
| STEP 3 | 10.0 | 9.00 | 11.30 | 11.00 | 10.00 | 9.30 |
| Glycerine, 96% USP (direct) | | | | | | |
| STEP 4 | 14.0 | 11.17 | 13.30 | 14.00 | 12.00 | 14.00 |
| Xylitol | | | | | | |
| N&A Tangerine (SD) | | | | | | |
| Encapsulated Acesulfame-K | | | | | | |
| Encapsulated Aspartame | | | | | | |
| Monoammonium Glycerrhizinate | | | | | | |
| Glucono Delta Lactone (GDL) | | | | | | |
| Sugar Powdered (direct) | | | | | | |
| Bakers Special Sugar | | | | | | |

|  | -continued | | | | | |
|---|---|---|---|---|---|---|
| STEP 5 | 22.00 | 16.00 | 18.00 | 18.00 | 17.30 | 18.30 |
| Double mint (Liq. Fiv.) | | | | | | |
| Tangerine (Liq.) | | | | | | |
| Art. Hot Capsicum (Liq.) | | | | | | |
| STEP 6 | 23.00 | 17.00 | 20.00 | 20.00 | 18.30 | 19.30 |
| Nor-Cap Peppermint | | | | | | |
| Nat. Peppermint (Dry) | | | | | | |
| TOTAL TIME (STOP MIXING) | 25.00 | 20.30 | 23.00 | 23.00 | 22.30 | 23.00 |

CAFFEINE CONTENT ANALYSIS FOR SHEETED MATERIAL
BATCH NUMBERS 24, 25, 26, 27, 28, 29

| Sample Number | "mg" caffeine | Stick Weight "grams" |
|---|---|---|
| 1. Batch 24, Row 1, Sheet 1 | 50.765 | 2.8872 |
| 2. Batch 24, Row 2, Sheet 2 | 50.7286 | 2.8775 |
| 3. Batch 24, Row 3, Sheet 3 | 49.7874 | 2.8181 |
| 4. Batch 24, Row 4, Sheet 4 | 48.1592 | 2.7352 |
| 5. Batch 24, Row 5, Sheet 5 | 47.7324 | 2.7533 |
| 6. Batch 24, Row 6, Sheet 6 | 48.2424 | 2.8268 |
| 7. Batch 25, Row 1, Sheet 1 | 49.1657 | 2.7888 |
| 8. Batch 25, Row 2, Sheet 2 | 49.3263 | 2.8192 |
| 9. Batch 25, Row 3, Sheet 3 | 50.0901 | 2.8379 |
| 10. Batch 25, Row 4, Sheet 4 | 48.0545 | 2.7776 |
| 11. Batch 25, Row 5, Sheet 5 | 47.6412 | 2.7704 |
| 12. Batch 25, Row 6, Sheet 6 | 47.6178 | 2.8044 |
| 13. Batch 26, Row 1, Sheet 1 | 43.0816 | 2.9027 |
| 14. Batch 26, Row 2, Sheet 2 | 44.8283 | 2.8731 |
| 15. Batch 26, Row 3, Sheet 3 | 46.2871 | 2.8752 |
| 16. Batch 26, Row 4, Sheet 4 | 44.1988 | 2.841 |
| 17. Batch 26, Row 5, Sheet 5 | 44.9666 | 2.8672 |
| 18. Batch 26, Row 6, Sheet 6 | 44.7669 | 2.8595 |
| 19. Batch 27, Row 1, Sheet 1 | 48.0769 | 2.8159 |
| 20. Batch 27, Row 2, Sheet 2 | 47.9237 | 2.8299 |
| 21. Batch 27, Row 3, Sheet 3 | 48.1799 | 2.8646 |
| 22. Batch 27, Row 4, Sheet 4 | 46.6627 | 2.8143 |
| 23. Batch 27, Row 5, Sheet 5 | 46.4242 | 2.8088 |
| 24. Batch 27, Row 6, Sheet 6 | 46.335 | 2.7682 |
| 25. Batch 28, Row 1, Sheet 1 | 50.6639 | 2.796 |
| 26. Batch 28, Row 2, Sheet 2 | 46.9128 | 2.7904 |
| 27. Batch 28, Row 3, Sheet 3 | 46.2913 | 2.7876 |
| 28. Batch 28, Row 4, Sheet 4 | 48.8249 | 2.8011 |
| 29. Batch 28, Row 5, Sheet 5 | 46.4364 | 2.7783 |
| 30. Batch 28, Row 6, Sheet 6 | 46.5535 | 2.7739 |
| 31. Batch 28, Row 1, Sheet 1 | 46.6716 | 2.8084 |
| 32. Batch 29, Row 2, Sheet 2 | 46.8225 | 2.8043 |
| 33. Batch 29, Row 3, Sheet 3 | 47.6069 | 2.8404 |
| 34. Batch 29, Row 4, Sheet 4 | 45.6441 | 2.8202 |
| 35. Batch 29, Row 5, Sheet 5 | 45.8553 | 2.8108 |
| 36. Batch 29, Row 6, Sheet 6 | 48.8765 | 2.8308 |

|  |  | Specifications |  | Target |
|---|---|---|---|---|
| Mean | 47.3945 | 42.5–57.5 | 2.818306 | 2.7–3.0 grams |
| Sample Standard Deviation | 1.867175 |  | 0.039571 |  |
| Relative Standard Deviation | 3.939644 | <6.0% | 1.404083 |  |

CAFFEINE CONTENT ANALYSIS FOR PACKAGED MATERIAL
Composite Consisting of Batches 24, 25, 26, 27, 28, & 29

|  | Sample Weight "Stick Weight in Grams" | Caffeine "mg" |
|---|---|---|
| 1. Pack 1 | 2.9254 | 49.4341 |
| 2. Pack 2 | 2.8443 | 49.7941 |
| 3. Pack 3 | 2.8570 | 50.5194 |
| 4. Pack 4 | 2.7534 | 48.7681 |
| 5. Pack 5 | 2.9663 | 51.4510 |
| 6. Pack 6 | 2.7974 | 46.8382 |
| 7. Pack 7 | 2.7900 | 47.5576 |
| 8. Pack 8 | 2.8215 | 47.8522 |
| 9. Pack 9 | 2.8754 | 47.4922 |
| 10. Pack 10 | 2.8801 | 47.3129 |
| Average = | 2.85108 | 48.70198 |
| STDEV = | 0.064414 | 1.545306 |
| Relative STD % = | 2.259283 | 3.172984 |

The experimental results demonstrate that the mixing, sheeting and subsequent packaging of the chewing gum compositions, pursuant to the present invention, produce a homogenous chewing gum with consistent caffeine content throughout the mix. Specifically, the tested chewing gum compositions met the standard of USPXXIII Uniformity of Dosage Units Per Content Uniformity for caffeine content. In accordance with this standard, uniform caffeine contents are met if the amount of ingredient in each of the samples determined by the Content Uniformity method lies within the range of 85% to 115% of the label claim of 50 mg of caffeine per stick and the Relative Standard deviation is less than or equal to 6.0%.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A chewing gum composition comprising:
    a water insoluble base portion;
    a water soluble portion; and
    caffeine, the caffeine having a particle size distribution of about 0.0% on 40 mesh, about 1–20% on 60 mesh, about 5–30% on 80 mesh, and at least about 50% through 80 mesh.

2. The chewing gum composition of claim 1 wherein the caffeine comprises at least about 0.3% by weight of the chewing gum composition.

3. The chewing gum composition of claim 1 wherein the caffeine comprises about 0.3% to 3.7% by weight of the chewing gum composition.

4. The chewing gum composition of claim 1 wherein the chewing gum includes sugar.

5. The chewing gum composition of claim 1 wherein the chewing gum is substantially wax free.

6. The chewing gum composition of claim 1 wherein the chewing gum is a low calorie chewing gum.

7. The chewing gum composition of claim 1 wherein the chewing gum includes at least one sweetener selected from the group consisting of: aspartame, salts of acesulfame, and xylitol.

8. The chewing gum composition of claim 1 wherein the chewing gum includes at least one natural or artificial flavoring agent selected from the group consisting of: monoammonium glycerrhizinate; glucono delta lactone; artificial hot capsicum; tangerine oil; cinnamon oil; peppermint oil; and natural or artificial flavor enhancers.

9. A stick chewing gum composition comprising:
    a water insoluble base portion;
    a water soluble portion;
    caffeine, the caffeine having a particle size distribution of about 0.0% on 40 mesh, about 1–20% on 60 mesh, about 5–30% on 80 mesh, and at least about 50% through 80 mesh; and
    the stick of chewing gum have a substantially uniform distribution of caffeine throughout.

10. The chewing gum composition of claim 9 wherein the caffeine comprises at least about 0.3% by weight of the chewing gum composition.

11. The chewing gum composition of claim 9 wherein the caffeine comprises about 0.3% to 3.7% by weight of the chewing gum composition.

12. The chewing gum composition of claim 9 wherein the chewing gum includes sugar.

13. The chewing gum composition of claim 9 wherein the chewing gum is substantially wax free.

14. The chewing gum composition of claim 9 wherein the chewing gum is a low calorie chewing gum.

15. The chewing gum composition of claim 9 wherein the chewing gum includes at least one sweetener selected from the group consisting of: aspartame, salts of acesulfame, and xylitol.

16. The chewing gum composition of claim 9 wherein the chewing gum includes at least one natural or artificial flavoring agent selected from the group consisting of: monoammonium glycerrhizinate; glucono delta lactone; artificial hot capsicum; tangerine oil; cinnamon oil; peppermint oil; natural flavor enhancers; and artificial flavor enhancers.

17. A chewing gum composition comprising:
    a water insoluble base portion;
    a water soluble base portion;
    caffeine, the caffeine comprising about 0.3% to about 3.7% of the chewing gum composition and having a particle size distribution of about 0.0% on 40 mesh, about 1–20% on 60 mesh, about 5–30% on 80 mesh, and at least about 50% through 80 mesh; and
    at least one flavoring agent selected from the group consisting of: monoammonium glycerrhizinate; glucono delta lactone; artificial hot capsicum; tangerine oil; cinnamon oil; peppermint oil; natural flavor enhancers; and artificial flavor enhancers.

18. The chewing gum composition of claim 17 wherein the chewing gum includes sugar.

19. The chewing gum composition of claim 17 wherein the chewing gum is substantially wax free.

20. The chewing gum composition of claim 17 wherein the chewing gum is a low calorie chewing gum.

21. The chewing gum composition of claim 17 wherein the chewing gum includes at least one sweetener selected from the group consisting of: aspartame, salts of acesulfame, and xylitol.

* * * * *